(12) United States Patent
Richardson et al.

(10) Patent No.: US 10,449,919 B2
(45) Date of Patent: Oct. 22, 2019

(54) METHOD AND DEVICE FOR REINFORCEMENT

(71) Applicant: Zephyros, Inc., Romeo, MI (US)

(72) Inventors: Henry E. Richardson, Washington, MI (US); Alexander Gabriel Mangiapane, Macomb Township, MI (US)

(73) Assignee: ZEPHYROS, INC., Romeo, MI (US)

( * ) Notice: Subject to any disclaimer, the term of this patent is extended or adjusted under 35 U.S.C. 154(b) by 311 days.

(21) Appl. No.: 15/309,106

(22) PCT Filed: May 19, 2015

(86) PCT No.: PCT/US2015/031555
§ 371 (c)(1),
(2) Date: Nov. 4, 2016

(87) PCT Pub. No.: WO2015/179383
PCT Pub. Date: Nov. 26, 2015

(65) Prior Publication Data
US 2017/0072887 A1     Mar. 16, 2017

Related U.S. Application Data

(60) Provisional application No. 62/000,067, filed on May 19, 2014.

(51) Int. Cl.
*B60R 19/34* (2006.01)
*B62D 29/00* (2006.01)
*B62D 29/04* (2006.01)

(52) U.S. Cl.
CPC ............ *B60R 19/34* (2013.01); *B62D 29/002* (2013.01); *B62D 29/048* (2013.01); *B60Y 2306/01* (2013.01)

(58) Field of Classification Search
CPC .... B60R 19/34; B62D 29/048; B62D 29/002; B60Y 2306/01
See application file for complete search history.

(56) References Cited

U.S. PATENT DOCUMENTS

| 5,575,526 A | 11/1996 | Wycech |
| 5,755,486 A | 5/1998 | Wycech |

(Continued)

FOREIGN PATENT DOCUMENTS

| CN | 102905961 | 1/2013 |
| CN | 103025599 | 4/2013 |

(Continued)

OTHER PUBLICATIONS

Written Opinion of the International Preliminary Examining Authority for Application No. PCT/US2015/031555 dated Apr. 15, 2016.

(Continued)

*Primary Examiner* — Christopher T Schatz
(74) *Attorney, Agent, or Firm* — The Dobrusin Law Firm, P.C.; Daniela M. Thompson-Walters

(57) ABSTRACT

A method comprising: (i) forming a reinforcement device by the following steps: forming a first member (1) and a second member (2), applying an adhesive (3) to the first member (1) and the second member (2), attaching at least one connecting feature to the first member (1), the second member (2), or both, bringing the first member (1) and the second member (2) together to form a clam-like structure, locking the first member (1) and the second member (2) with the at least one connecting feature, forming a first encasing member and a second encasing member, attaching the first encasing member to the second encasing member to form an encasing around the clam-like structure, (ii) exposing the reinforcement device to electrocoating, wherein the adhesive expands during the electro coating and bonds the first member (1) to (Continued)

the second member (2) and bonds the clam-like structure to the encasing.

18 Claims, 4 Drawing Sheets

(56) References Cited

U.S. PATENT DOCUMENTS

| | | | |
|---|---|---|---|
| 5,766,719 | A | 6/1998 | Rimkus |
| 5,932,680 | A | 8/1999 | Heider |
| 6,131,897 | A | 10/2000 | Barz et al. |
| 6,311,452 | B1 | 11/2001 | Barz et al. |
| 6,854,790 | B2 | 2/2005 | Yoshida |
| 6,863,338 | B2 | 3/2005 | Stahl |
| 6,935,681 | B2 | 8/2005 | Hasler et al. |
| 7,318,873 | B2 | 1/2008 | Czaplicki et al. |
| 7,621,373 | B2 | 11/2009 | Helferty |
| 7,673,930 | B2 | 3/2010 | Stratman |
| 7,735,906 | B2 | 6/2010 | Takahashi et al. |
| 8,020,924 | B2 | 9/2011 | Niezur et al. |
| 8,361,589 | B2 | 1/2013 | Kraushaar |
| 8,388,037 | B2 | 3/2013 | LaNore et al. |
| 2005/0016807 | A1 | 1/2005 | Braymand |
| 2005/0082872 | A1 | 4/2005 | Rich |
| 2005/0127145 | A1 | 6/2005 | Czaplicki et al. |
| 2005/0212326 | A1 | 9/2005 | Marion |
| 2007/0212999 | A1 | 9/2007 | Godett |
| 2008/0029200 | A1 | 2/2008 | Sheasley |
| 2009/0085379 | A1 | 4/2009 | Takahashi |
| 2009/0309387 | A1 | 12/2009 | Goral et al. |
| 2010/0092733 | A1 | 4/2010 | Blank et al. |
| 2011/0189428 | A1 | 8/2011 | Belpaire et al. |
| 2011/0206890 | A1 | 8/2011 | Belpaire et al. |
| 2011/0236616 | A1 | 9/2011 | Belpaire |
| 2012/0141724 | A1 | 6/2012 | Belpaire et al. |
| 2013/0049406 | A1 | 2/2013 | Hasl |
| 2013/0133771 | A1 | 5/2013 | Richardson et al. |
| 2013/0181470 | A1 | 7/2013 | LaNore et al. |
| 2013/0202842 | A1 | 8/2013 | Meier |

FOREIGN PATENT DOCUMENTS

| | | |
|---|---|---|
| EP | 1391368 | 2/2004 |
| EP | 1398224 | 3/2004 |
| EP | 2154052 A1 | 2/2010 |
| EP | 2159109 A1 | 3/2010 |
| EP | 2159136 A1 | 3/2010 |
| EP | 2401191 B1 | 10/2013 |
| WO | 01/68394 | 9/2001 |
| WO | 03/020574 | 3/2003 |
| WO | 2009/080814 A1 | 7/2009 |
| WO | 2010/018190 A1 | 2/2010 |
| WO | 2010/097120 A1 | 9/2010 |
| WO | 2013/082238 | 6/2013 |

OTHER PUBLICATIONS

International Search Report for Application No. PCT/US2015/031555 dated Jul. 22, 2015.
Chinese Office Action, Application No. 201580025735.2 dated Jun. 4, 2018.

METHOD AND DEVICE FOR REINFORCEMENT

FIELD

The present teachings generally relate to a reinforcement device utilized in vehicles and its method of production.

BACKGROUND

Reinforcement devices such as crash boxes or shock absorbers are implemented in automobiles and other vehicles to absorb an impact during an accident and prevent or reduce damage to the vehicle. Crash boxes are generally deigned to absorb energy of the initial impact and reduce transmitted force. Typical crash boxes are tubes with undulations which may have a honeycomb structure.

It is a challenge to produce sufficiently strong yet lightweight crash boxes or other reinforcement devices efficiently. It would be attractive to have an efficient production method for a crash box or another reinforcement device which would be sufficiently strong to resist deformation, thus preventing damage to various parts of vehicles such as engine compartments and passenger cabins, while being lightweight as not to add additional weight to the vehicle. Further, it would be desirable to have a method for producing such reinforcing devices under normal production conditions, for example, while achieving fast cooling time and typical cycle time during an injection molding process.

SUMMARY

One possible method of the present teachings includes forming a reinforcement device by the following steps: forming a first member and a second member, applying an adhesive to the first member and the second member, attaching at least one connecting feature to the first member, the second member, or both, bringing the first member and the second member together to form a clam-like structure, locking the first member and the second member with the at least one connecting feature, forming a first encasing member and a second encasing member, attaching the first encasing member to the second encasing member to form an encasing around the clam-like structure: exposing the reinforcement device to electrocoating, wherein the adhesive expands during the electrocoating and bonds the first member to the second member and bonds the clam-like structure to the encasing The methods disclosed herein may also include a step of injection molding the first member and the second member. The first member, the second member, or both may be formed with one or more recesses, trenches, depressions, walls, protrusions, projections, or a combination thereof. The first member and the second member may be overmolded with an adhesive. The first encasing member may be connected to the second encasing member by welding so that the first and second members are sandwiched within the encasing. The first member and the second member may be extruded. An anti-corrosion coating may be located onto the encasing by electrolysis. The anti-corrosion coating may be dried and cured in an oven during the electrocoating. The first member and the second member may be formed as separate pieces.

The first member and the second member may comprise a light-weight material such as nylon. The first member and the second member may have undulating complimentary shapes so that the first member and the second member interlace when brought together. The connecting feature between the first and second members may be a snap feature. The encasing may be made from steel. The adhesive may be an epoxy-based heat expandable adhesive. The first encasing member and the second encasing member may include one or more tubes. The one or more tubes may run perpendicularly to the direction in which the first and second members interlace. At least one of the one or more tubes may extend beyond the length of the length of the first member, second member, or both. The reinforcement member may serve as a crash box in a vehicle. The reinforcement device may withstand a crash load of at least about 100,000 pounds.

The present teachings provide a method for producing a reinforcement device that is sufficiently strong to resist deformation during impact and that is sufficiently lightweight so that the reinforcement device can be used in a vehicle. The present teachings further provide a method which can utilize normal production conditions such as typical cycle time during injection molding and which does not require prolonged cooling time.

DETAILED DESCRIPTION

Figure 1:
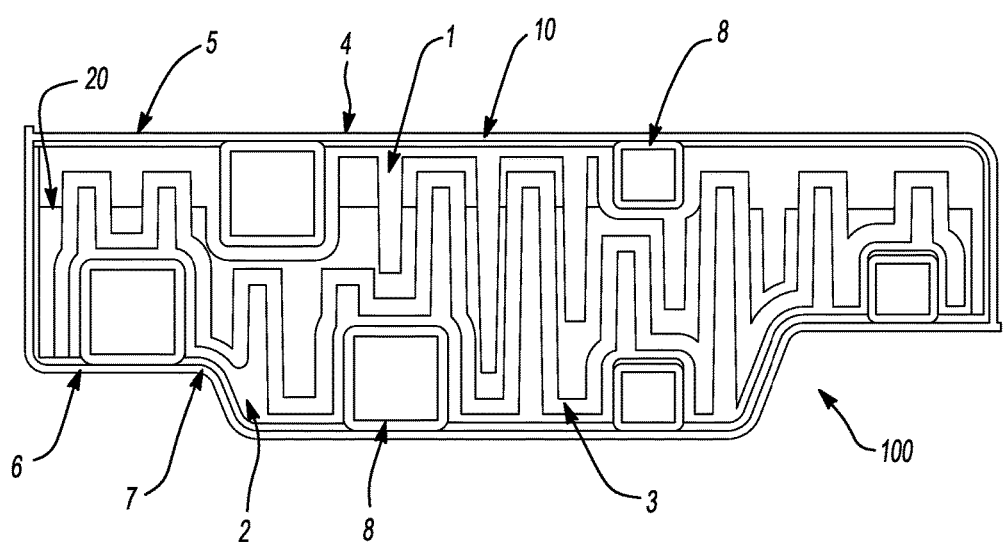
FIG. 1 illustrates one example of a reinforcement device in accordance with the teachings herein.

This application claims the benefit of the filing date of U.S. Provisional Application No. 62/000,067, filed May 19, 2014, the contents of this application being hereby incorporated by reference herein for all purposes.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a method for creating a reinforcement device for a vehicle such as an automobile, bus, truck, train, watercraft, aircraft, and/or spacecraft. The reinforcement member provides strength, prevents one or more parts of the vehicle from being crushed during an impact, prevents deformation of certain parts of the vehicle such as a passenger cabin during an impact, absorbs impact energy, serves as a blocker during an impact, serves as a crash box, serves as any part within the vehicle needing a high impact strength, the like, or a combination thereof. The reinforcement device may have any size, shape, configuration, or a combination thereof to perform these functions. The reinforcement device may be made from any material or a combination of materials so that the reinforcement device can perform these functions while being lightweight as not to add extra weight to the vehicle. Preferably, the reinforcement device withstands a crush load of 50,000 pounds or more, 100,000 pounds or more, 150,000 pounds or more, or more preferably 250,000 pounds or more, or even more preferably 500,000 pounds or more without significant deformation. Preferably, the reinforcement device weighs 50 pounds or less, 30 pounds or less, more preferably 15 pounds or less, or even more preferably 5 pounds or less. The reinforcement device may be installed anywhere within the vehicle. Preferably, the reinforcement device is installed nearby, at, on, in, within, or a combination thereof, a part the reinforcement device may shield from impact. The reinforcement device may be installed in place of a crash box. The reinforcement device may be installed nearby, on, at, in, or a combination thereof, the bumper crush tube of a vehicle. Preferably, the reinforcement device is an engine blocker protecting a vehicle's engine by resisting deformation during a crash which may be installed on the fan engine mount of the front bumper of a vehicle, protecting the vehicle's engine from impact. The reinforcement device may consist of a plurality of members. Preferably, the reinforcement device consists of a first member, a second member, an adhesive, a connecting feature, an encasing, one or more tubes, the like, or a combination thereof.

The first and second members preferably provide added strength to the reinforcement device so that the reinforcement device can absorb impact energy end/or resist deformation during an impact. The first and second members may have any size, shape, configuration, or a combination thereof so that the first and second members may be joined together to form the reinforcement device so that the reinforcement device may be useful for intended application within a vehicle. The specific shape of the first and second members will be determined by the needs, the size, and shape of the reinforcement device and its application within a vehicle. Preferably, the first and second members have complimentary undulating shapes which allow for interlacing of the first and second members. The first member, the second member, or both, may have a contoured, undulating surface with one or more recesses, trenches, depressions, walls, protrusions, projections, the like, or a combination thereof. Preferably, the one or more protrusions, projections, walls, the like, or a combination thereof, project from the surface of one of the members in a finger-like manner. Even more preferably, the one or more protrusions, projections, walls, the like, or a combination thereof fit within the one or more depressions, trenches, recesses, the like, or a combination thereof of the other member once the first and second members are brought together. Preferably, the first member has one or more recesses. The one or more recesses may have different length, height, depth, or the combination thereof. The one or more recesses may be divided from each other by one or more walls. The one or more walls may have different length, height, thickness, or a combination thereof. The second member may have one or more sets of projections. Preferably, the one or more sets of projections have any size, shape, configuration, or a combination thereof to compliment the size, shape, configuration, or a combination thereof of the one or more recesses of the first member so that the first and second members may be joined together in an interlacing manner. The projections within the one or more sets of projections may be divided from each other by one or more depressions, one or more recesses, one or more walls, the like, or a combination thereof. Preferably, the second member has two sets of projections: the first set and the second set of projections. There may be one or more projections within the first set of projections and one or more projections within the second set of projections. The one or more projections of the first set of projections may run parallel to each other. The one or more projections of the first set of projections may be divided from each other by one or more depressions, trenches, walls, the like, or a combination thereof. Preferably, the one or more projections of the first set of projections are divided from each other by one or more depressions which run parallel to the first set of projections. The second set of projections may run perpendicular to the first set of projections and the one or more depressions. The one or more projections of the second set of projections may run parallel to each other. The one or more projections of the second set of projections may be divided from each other by the first set of projections, the one or more depressions, trenches, walls, the like, or a combination thereof. Preferably, there is a plurality of rows of the second set of projections. The one or more projections within the first set of projections and/or the second set of projections may have the same size, shape, configuration, or a combination thereof as one or more projections within the other set. Alternatively, projections in the first set or the second set may have different size, shape, configuration, or a combination thereof as one or more projections within the other set. Preferably, one or more projections within the second set have greater height, length, width, or a combination thereof, than the one or more projections within the first set.

The first member, the second member, or both are made from a material with high mechanical strength and good rigidity which enables the reinforcement device to absorb impact energy and/or resist deformation during an impact while allowing the reinforcement device to be lightweight. The first and second members are made from any suitable material to meet requirements of specific application within a vehicle. Preferably, the first member and the second member are made from a material which is lightweight so that both the first member and the second member weight 30 pounds or less, more preferably 15 pounds or less, even more preferably 5 pounds or less, most preferably 1 pound or less. The first and second members may be made of metal or plastic. Preferably, the first and/or second members are made from a plastic so that the first and/or second members may be injection molded, blow molded, or extruded. Preferably, the first and/or second members are made from a rigid plastic such as polyamides (e.g. nylons) or polyolefins (e.g. polypropylene or polybutylene). Even more preferably, the first and/or second members are made from Nylon 6,6, or another plastic which may be unreinforced or reinforced with glass fiber, mineral, or both, toughened, or a combination thereof. The percentage of mineral andior glass fiber reinforcement may be adjusted to meet requirements of a specific application to achieve improved surface appearance, lower melting point for energy savings, different strength and stiffness requirements, improved chemical resistance, impact strength, and increased performance at elevated temperatures.

The first and second members may be formed using a variety of techniques which may be automatic, semi-automatic, or manual. Such techniques include injection molding, blow molding, rotation molding, compression molding, extrusion, or otherwise. Preferably, the first and second members are formed by injection molding. Preferably, the first and second members are formed separately and subsequently joined and/or locked together with one or more connecting features to form a clam-like structure. Even more preferably, the first and second members are bonded together during an electrocoating process.

The adhesive bonds the first member and the second member and bonds the clam-like structure to the encasing so that the reinforcement device withstands a crush load of 100,000 pounds or more. Preferably, the adhesive bonds are strong enough so that the reinforcement device withstands a crush load of 150,000 pounds or more, or 250,000 pounds or more, or more preferably 500,000 pounds or more without deformation. The adhesive can be any material with optimum mechanical properties to fulfil this function. The adhesive may foam and/or expand to fill gaps between the first member and the second member and gaps between the clam-like structure and the encasing. Preferably, the adhesive withstands heat during expansion, exhibits high compressive strength, high compressive modulus, glass transition temperature that exceeds 200° F., high cured ductility enabling the material to deform plastically when stress exceeding the material yield strength is applied, relatively high viscosity at zero shear rate, and a relatively low viscosity at higher shear rates before curing to enable the adhesive to flow easily while being dispensed and have minimal flow after dispensing, the like, or a combination thereof. The adhesive may comprise one or several different materials. The adhesive may be a copolymer or a terpolymer. The adhesive may comprise activatable or non-activatable material. Preferably, the adhesive comprises a heat activatable material configured to expand upon application of energy (such as heat or otherwise). Preferably, the heat activatable material is an expandable polymer or plastic. Even more preferably, the heat activatable material is a polymer or plastic that is foamable. The adhesive should be chosen according to the rate of expansion required. The expandable adhesive may expand at a desired temperature and firmly bond the first member to the second member and the clam-like structure to the encasing. Preferably, the adhesive expands at the temperatures experienced in the electrocoat baking oven, typically 130° C. to 150° C. even though other temperature ranges are possible. Examples of an adhesive that may be used are epoxy based adhesives, silicon based adhesives, cyanacrylate adhesives, methacrylate adhesives, polyurethane adhesives, or a mixture thereof. Preferably, the adhesive is an epoxy-based material. An example of a preferred adhesive is a heat-expandable epoxy-based adhesive available from L&L Products of Romeo, Mich., under the designation L-5505.

The thickness of the applied adhesive may differ based upon a number of factors such as to what level the adhesive is activatable and/or expandable, the volume of open space between the first and second members, the volume of open space between the dam-like structure and the encasing to be filled, pliability of the adhesive, the like, or a combination thereof. The adhesive may be adhered to the first and second members by a variety of techniques. Such techniques include spraying, transfer printing, screen printing, curtain coating, roll coating, dispensing, overmolding. Preferably, the adhesive is overmolded onto the first member and the second member. The adhesive should be dry and not tacky to the touch before activation to facilitate handling, shipping, and prevent contamination. The adhesive may be adhered to the encasing during electrocoat baking process after the adhesive expands to fill one or more gaps between the clam-like structure and the encasing.

The reinforcement device may contain one or more connecting features that join the first member to the second member. The one or more connecting features may be anything that will mechanically connect the first member and the second member so that the first member and the second member may be joined together after the adhesive is applied to the first member and the second member, but before the adhesive expands to join the first member to the second member. The one or more connecting features may have any shape, size, configuration, or a combination thereof to meet requirements of a specific application within a vehicle. The one or more connecting features may be made from any material suitable to join the first member and the second member in a locking manner. For example, the one or more connecting features may be made from a metal, plastic, the like, or a combination thereof. The one or more connecting features may lock the first member to the second member so that the first member and the second member dose together in a dam-like arrangement. The one or more connecting features may be any mechanical fastening element such as a hinge, a latch, a detent, or any mechanical fastener such as a screw, rivet, pin, sheet-metal, push-on locknuts, dips, metal inserts, or a snap-fit connection, the like, or a combination thereof. Preferably, the connecting feature is a snap feature. Alternatively, the first member and the second member may be joined by fusion bonding, hot-gas welding, vibration welding, solvent bonding, ultrasonic welding, induction welding, dielectric welding, the like, or a combination thereof.

The encasing surrounds the first member and the second member and strengthens the reinforcement device. The encasing may have any size, shape, configuration, or a combination thereof to match the shape of the first member and the second member. The encasing may consist of one or more parts. Preferably, the encasing consists of at least two separate parts which may be brought together to form the encasing. Even more preferably, the encasing is assembled from the first encasing part and a second encasing part which are brought together around the clam-like structure. The encasing may be made from any material which can provide sufficient strength so that the reinforcement device withstands a crush load of 50,000 pounds or more, 100,000 pounds or more, 150,000 pounds or more, or more preferably 250,000 pounds or more, or even more preferably 500,000 pounds or more without deformation. Preferably, the encasing is made from a metal such as iron, nickel, chromium, tungsten, the like, or a combination thereof. More preferably, the encasing is made from an iron alloy containing other elements such as nickel, cobalt, molybdenum, chromium, silicon, manganese, carbon, niobium, aluminum, vanadium, copper, the like, or a combination thereof. Even more preferably, the encasing is made from maraging steel, stainless steel, steel iron-nickel, tool steel, the like, or a combination thereof.

The encasing and/or the one or more parts of the encasing may contain one or more tubes attached to the encasing. The one or more tubes attach the reinforcement device to a vehicle frame, to a member within a vehicle, or more preferably to a fan engine mount, or even more preferably to the front crash tube on the bumper of a vehicle. The one or more tubes strengthen the reinforcement device to withstand impact. The number and optimum distribution of the one or more tubes depend on the specific application of the reinforcement device. The one or more tubes may have a different size, shape, configuration, of a combination thereof so that the one or more tubes add strength to the reinforcement device. For example, the crass section of the one or more tubes can be circular, square, rectangular, triangular, trapezoidal, oval, elliptical, pentagonal, hexagonal, diamond, symmetrical, asymmetrical, the like, or a combination thereof. Preferably, the one or more tubes are long and thin with a square cross-section. Preferably, at least one tube has a diameter or cross-section smaller than at least one another tube. For example, tubes with smaller cross-section may serve for mounting of the reinforcement device within the vehicle while tubes with larger cross-section may serve to withstand impact. The one or more tubes may be hollow. The one or more tubes may extend in any direction. The one or more tubes may extend in the direction of the first and/or second members' protrusions, projections, walls, depressions, trenches, recesses, the like, or a combination thereof. The one of the tubes may run perpendicularly to the direction of at least one recess, trench, depression, wall, protrusion, and/or projection of the first member, the second member, or both. The one or more tubes may run perpendicularly to the direction in which the first and second members interlace. Preferably, the tubes extend in the direction of the first member's recesses and/or second member's first set of projections. At least some of the one or more tubes may have the same length as the first and/or second members, extend beyond the length of the first and/or second members, be shorter than the length of the first and/or second members, or a combination thereof. Preferably, at least some of the one or more tubes or more preferably all of the one or more tubes, extend beyond the length of the first member, second member, or both.

The method for creating the reinforcement device may include one or more of the following steps, and the steps may be performed in virtually any order. Forming the first member, the second member, the first encasing part, the second encasing part, the encasing, the clam-like structure, and/or applying the adhesive by an automatic, semi-automatic, and/or manual techniques. Utilizing a robot during one or more steps of reinforcement device production. Forming the first member and the second member. The first and second members may be formed by any technique capable of producing the first member and second member having a contoured surface with one or more recesses, trenches, depressions, walls, protrusions, projections, or a combination thereof. Injection molding, blow molding, rotation molding, compression molding, or extruding the first and the second members. Forming the first member and/or second member with one or more recesses, trenches, depressions, walls, protrusions, projections, or a combination thereof. The one or more recesses, trenches, depressions, walls, protrusions, projections, or a combination thereof may run in the same direction. Alternatively, at least one of the one or more recesses, trenches, depressions, walls, protrusions, and/or projections run in a different direction than at least one other recess, trench, depression, wall, protrusion, projection, or a combination thereof. Forming the first member and the second member in complimentary shapes so that the first member and the second member interlace, interlock, or both. Forming the first member and the second member as sufficiently small or large, thick or thin, and/or short or long pieces to provide sufficient strength to the reinforcement device to resist deformation. Injection molding the first and the second members in an injection molding machine. Forming the first member and the second member as separate pieces to allow for efficient production of the reinforcement device while allowing for formation of sufficiently thick first and second members to provide strength to the reinforcement device. Producing sufficiently large, thick, and/or long first and second members while achieving fast cooling time and typical injection cycle time such as 35-40 s cycle time. Forming (by injection molding or otherwise) the first member at the same time as the second member or forming (by injection molding or otherwise) the first member at a different time than the second member. Placing the material to form the first member into the injection molding machine. Injecting the material into a cavity such as a mold. Molding the first member. Repeating the process with the second member. Placing the material to form the second member into the injection molding machine, injecting the material into a different cavity than the mold for the first member, and molding the second member. Applying an adhesive to the first member and to the second member. Applying the adhesive to the first member before or after forming the second member. Applying the adhesive to the first member by placing the first member into a different cavity such as a different mold than the mold used for forming of the first member. Overmolding the adhesive onto the first member. Repeating the step with the second member. Placing the second member into a different cavity such as a different mold than the mold used for forming of the second member. Overmolding the adhesive onto the second member. Installing one or more connecting features on the first member, the second member, or both. Securing the first and second members together with the one or more connecting features. Creating a dam-like structure by bringing the first and second members together. Locking the first and second members together with the one or more connecting features. Forming the encasing. Forming separate parts of the encasing. Forming the first encasing part, the second encasing part, and/or encasing with one or more tubes. Forming the first encasing part and the second encasing part either one of which or both may include one or more tubes. Forming the first encasing part, the second encasing part, or both in such a way that at least one of the tubes runs perpendicularly to the direction in which the first and second members interlace, perpendicularly to the at least one recess, trench, depression, wall, protrusion, and/or projection of the first member and/or the second member, or a combination thereof. Bringing the first encasing member and the second encasing member together to form the encasing. Inserting the first member and the second member into the encasing. Alternatively, installing the first encasing member and the second encasing member around the clam-like structure. Connecting the first encasing member to the second encasing member around the clam-like structure by welding or another technique capable of joining the first encasing member to the second encasing member so that the first and second members are sandwiched within the encasing. Subjecting the encasing attached to the clam-like structure to the electrocoating or electrodeposition. Pretreating, cleaning, and/or phosphating the encasing's surface to achieve performance desired requirements. Depositing an anti-corrosion coating onto the encasing by electrolysis. Rinsing off excess particles which may cling to a surface of the encasing. Drying and baking the anticorrosion coating in an oven for sufficient amount of time such as 5 minutes or more, 15 minutes or more, or 20 minutes or more, or 60 minutes or less, or 50 minutes or less, or 30 minutes or less at 180° F. or more, or 250° F. or more, or more preferably 350° F. or more, or 600° F. or less, or 500° F. or less, or 400° F. or less. Cross-linking and curing the anticorrosion coating in the oven. Connecting, bonding, and/or locking the first member to the second member and the first and second members to the encasing in the oven by allowing the adhesive to foam and/or expand and/or fill the gaps between the first member and the second member and the clam-like structure and the encasing during the electrocoating.

FIG. 1 illustrates one example of a reinforcement device 100 of the teachings herein. As illustrated, the reinforcement device 100 is assembled from first member 1, second member 2, adhesive 3, and encasing 7. The first member 1 and the second member 2 have undulating complimentary shapes allowing for interlacing of the first member 1 and the second member 2. The first member 1 and the second member 2 are brought together and connected to form a clam-like structure 20. Adhesive 3 bonds the first member 1 to the second member 2 and further fills gaps 10 between the encasing 7 and the clam-like structure 20. The encasing 7 includes plurality of tubes 8 of different sizes serving for mounting of the reinforcement device 100 to a vehicle (not depicted) or as a strengthening element of the reinforcement device 100. The encasing is assembled from the first encasing part 5 and the second encasing part 6 which are attached to the first member 1 and the second member 2 after the adhesive is applied to the first member 1 and the second member 2 and after the first member 1 and the second member 2 are connected together, for example locked together using a connecting feature (not depicted). The encasing 7 is coated with an anti-corrosion coating 4.

Figure 2:
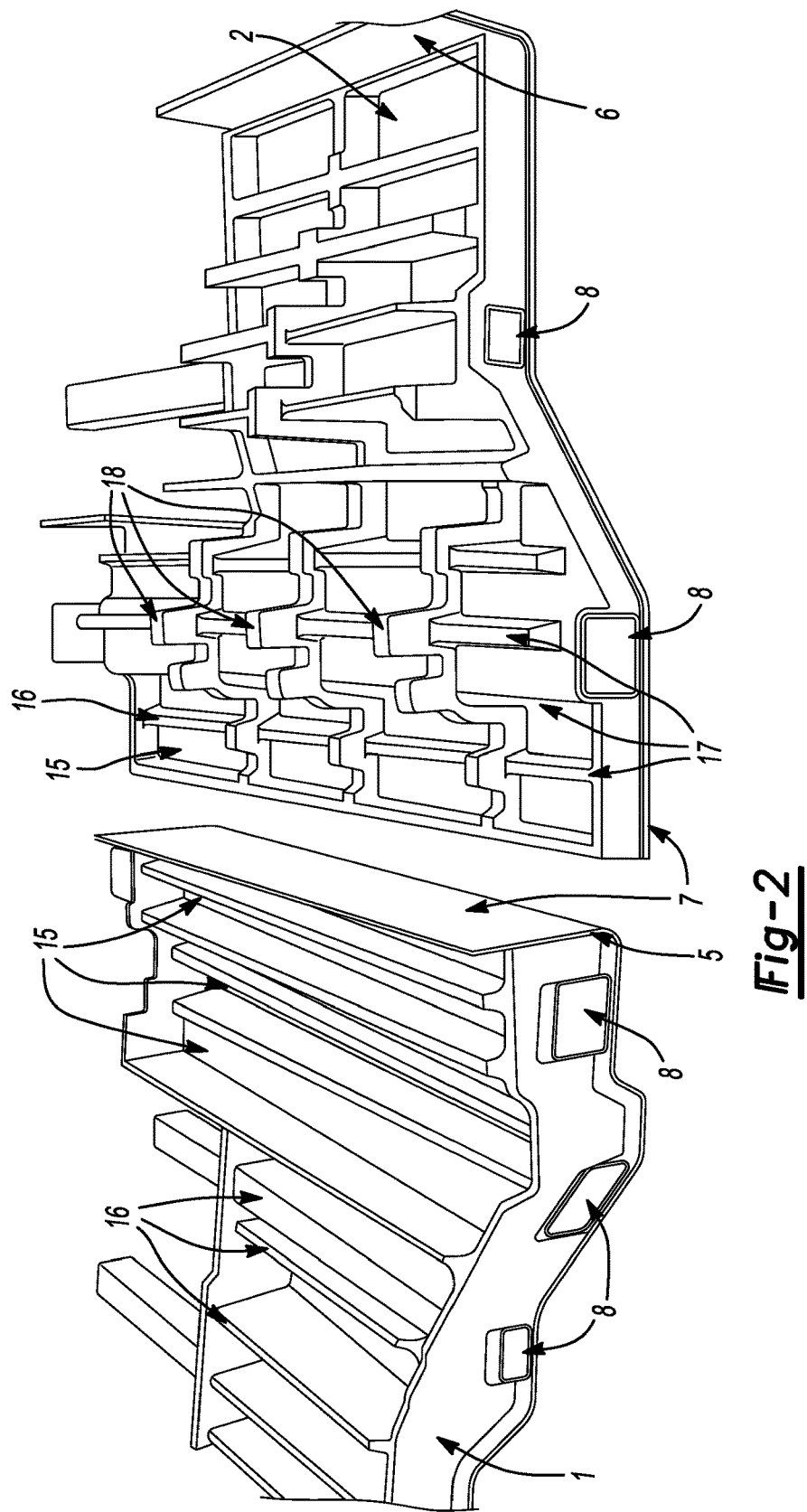
FIG. 2 shows an exemplary device including first member and a second member placed on a first encasing part and a second encasing part.

FIG. 2 shows a first member 1 and a second member 2 placed on a first encasing part 5 and a second encasing part 6 of the teachings herein. The first member 1 and second member 2 have undulating shapes featuring a plurality of trenches, depression, or recesses 15 and a plurality of walls, protrusions, or projections 16. The second member 2 further includes a first set of projections 17 and a second set of projections 18 running perpendicular to the first set of projections 17 and to the direction of tubes 8. The first encasing part 5 and the second encasing part 6 include tubes 8 having a square cross-section. The tubes 8 extend beyond the length of the first member 1 and the second member 2. The first encasing member 5 and the second encasing member 6 surround the external surface of the first member 1 and the second member 2 in such a way that they create encasing 7 around the whole perimeter of the first member 1 and the second member 2 once the first member 1 and the second member 2 are connected.

Figure 3:
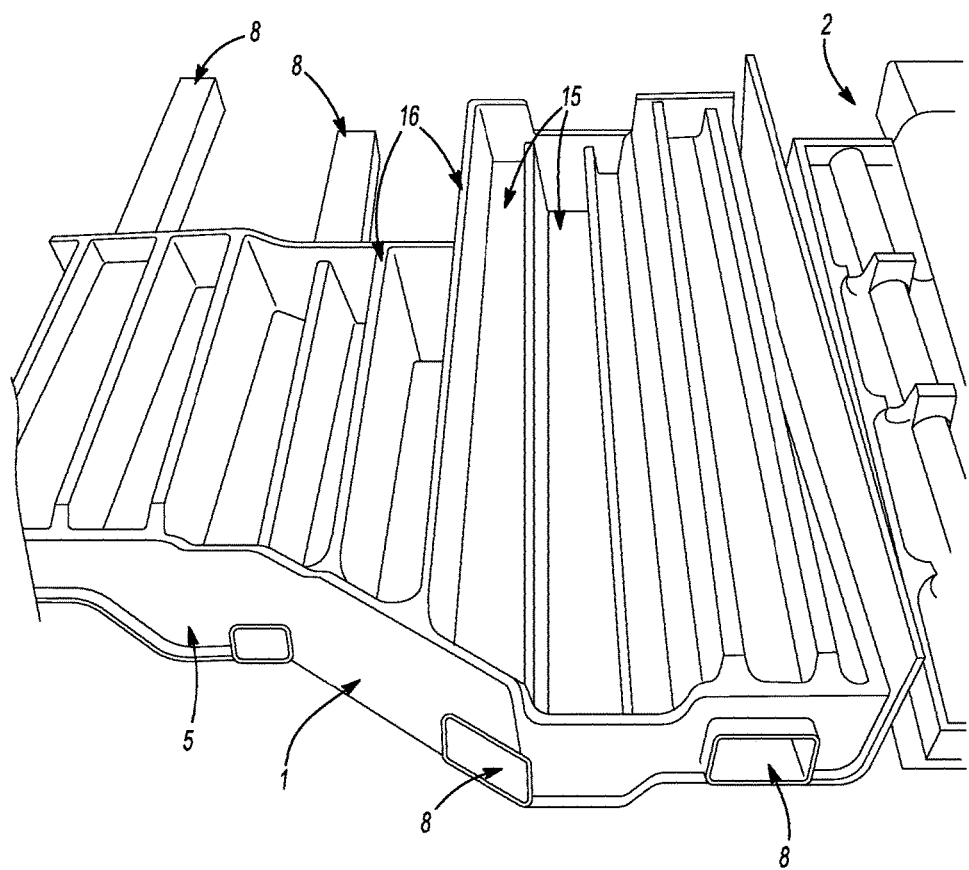
FIG. 3 shows a detailed view of a first member placed on a first encasing part including tubes in accordance with the teachings herein.

FIG. 3 shows a detailed view of a first member 1 placed on a first encasing part 5 including tubes 8 of the teachings herein. The first member 1 is formed to have a contoured surface containing a plurality of wails, protrusions, or projections 16 and a plurality of trenches, depressions, or recesses 15 which complement the shape of the second member 2. The walls, protrusions, or projections 16 and the trenches, depressions, or recesses 15 of the first member 1 have different width, depth, height, and length to compliment the shape of the second member 2.

Figure 4:
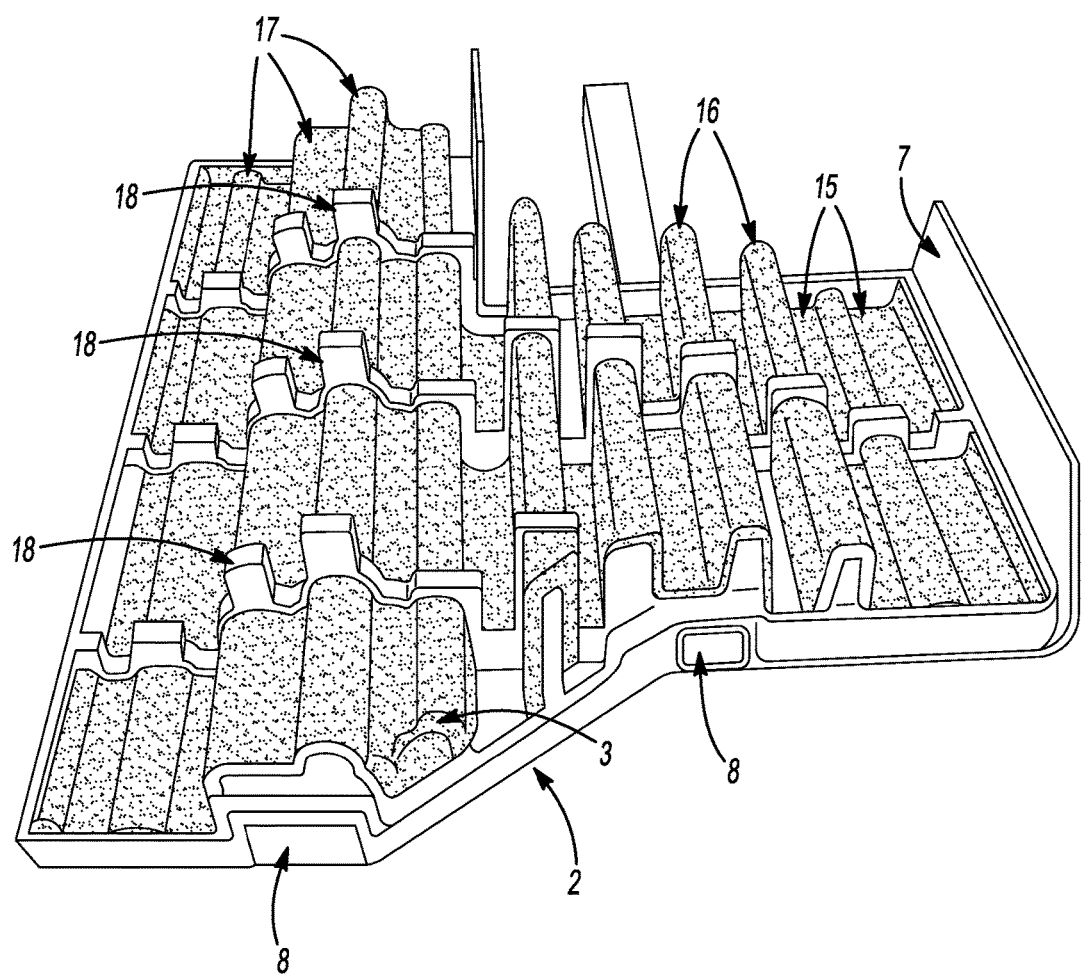
FIG. 4 shows a detailed view of a second member placed on a second encasing part including tubes in accordance with the teachings herein.

FIG. 4 shows a detailed view of a second member 2 placed on a second encasing part 6 including tubes 8 of the teachings herein. As illustrated, the second member 2 features a plurality of walls, protrusions, or projections 16 and a plurality of trenches, depressions, or recesses 15. Specifically, the surface of the second member 2 features a first set of projections 17 which are running parallel to the direction of steel tubes 8, and three rows of a second set of projections 18 which are running perpendicular to the direction of the first set of projections 17. The walls, protrusions, or projections 16 and the trenches, depressions, or recesses 15 of the second member 2 have different width, depth, height, and length to compliment the shape of the first member 1. Majority of the surface of the second member in this figure has been overmolded with adhesive 3 which later expands and fills gaps between the first member 1 and the second member 2 and the clam-like structure (not depicted) and the encasing 7 (not depicted) during the electrocoating.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all anges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method comprising:
   (i) forming a reinforcement device by the following steps:
      forming a first member having a contoured, undulating surface with one or more recesses, trenches, depressions, walls, protrusions, projections, or a combination thereof,
      forming a second member having a contoured, undulating surface with one or more recesses, trenches, depressions, walls, protrusions, projections, or a combination thereof, wherein the contoured, undulating surface of the second member complements the contoured, undulating surface of the first member so that the first member and the second member interlace when brought together,
      applying an adhesive to the first member and the second member, wherein the adhesive is applied to a majority of the contoured, undulating surface of the first member, the second member, or both,
      attaching at least one connecting feature to the first member, the second member, or both,
      bringing the first member and the second member together to form a clam-like structure,
      locking the first member and the second member with the at least one connecting feature,
      forming a first encasing member and a second encasing member,
      attaching the first encasing member to the second encasing member to form an encasing around the clam-like structure,
   (ii) exposing the reinforcement device to electrocoating, wherein the adhesive expands during the electrocoating and bonds the first member to the second member and bonds the clam-like structure to the encasing.

2. The method of claim 1, wherein the method includes a step of injection molding the first member and the second member.

3. The method of claim 1, wherein the first member and the second member are made from a light-weight material.

4. The method of claim 1, wherein at least one of the one or more recesses, trenches, depressions, walls, protrusions, and/or projections run in a different direction than at least one other recess, trench, depression, wall, protrusion, projection, or a combination thereof.

5. The method of claim 1, wherein the method includes a step of overmolding the first member and the second member with the adhesive.

6. The method of claim 1, wherein the connecting feature is a snap feature.

7. The method of claim 1, wherein the attaching the first encasing member to the second encasing member around the first member and the second members includes welding so that the first member and the second members are sandwiched within the encasing.

8. The method of claim 1, wherein the encasing is made from steel.

9. The method claim 1, wherein the adhesive is an epoxy-based heat expandable adhesive.

10. The method of claim 1, wherein the method includes a step of extruding the first member and the second member.

11. The method of claim 1, wherein the first encasing member and the second encasing member include one or more tubes.

12. The method of claim 11, wherein the one or more tubes run perpendicularly to a direction in which the first member and the second member interlace.

13. The method of claim 11, wherein at least one of the one or more tubes extends beyond a length of the length of the first member, the second member, or both.

14. The method of claim 1, wherein the reinforcement device serves as a crash box in a vehicle.

15. The method of claim 1, wherein the method includes steps of depositing an anti-corrosion coating onto the encasing by electrolysis and drying and curing the anti-corrosion coating in an oven during the electrocoating.

16. The method of claim 1, wherein the method includes a step of forming the first member and the second member as separate pieces.

17. The method of claim 1, wherein the encasing includes one or more tubes running perpendicularly to a direction in which the first member and the second member interlace.

18. The method of claim 1, wherein the reinforcement device withstands a crash load of 100,000 pounds.

* * * * *